(12) United States Patent
Crombez et al.

(10) Patent No.: US 9,718,359 B2
(45) Date of Patent: Aug. 1, 2017

(54) BRAKING DISPLAY SYSTEM AND METHOD

(75) Inventors: Dale Scott Crombez, Livonia, MI (US); Ryan Skaff, Farmington Hills, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1051 days.

(21) Appl. No.: 13/221,284

(22) Filed: Aug. 30, 2011

(65) Prior Publication Data
US 2013/0049945 A1 Feb. 28, 2013

(51) Int. Cl.
*B60Q 1/00* (2006.01)
*B60K 35/00* (2006.01)
*B60T 17/22* (2006.01)
*B60L 11/14* (2006.01)
*B60L 15/20* (2006.01)
(Continued)

(52) U.S. Cl.
CPC .............. *B60K 35/00* (2013.01); *B60K 6/445* (2013.01); *B60L 7/26* (2013.01); *B60L 11/123* (2013.01); *B60L 11/14* (2013.01); *B60L 11/1861* (2013.01); *B60L 15/2009* (2013.01); *B60T 1/10* (2013.01); *B60T 13/586* (2013.01); *B60T 17/22* (2013.01); *B60K 2350/1092* (2013.01); *B60L 2240/12* (2013.01); *B60L 2240/421* (2013.01); *B60L 2240/423* (2013.01); *B60L 2240/443* (2013.01); *B60L 2240/545* (2013.01); *B60L 2250/16* (2013.01); *B60W 30/18127* (2013.01); *Y02T 10/6217* (2013.01); *Y02T 10/6239* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(58) Field of Classification Search
CPC ......................................................... B60T 17/22
USPC ............. 180/165; 340/439, 441; 701/22, 70; 702/165
See application file for complete search history.

(56) References Cited

U.S. PATENT DOCUMENTS 5,910,722 A 6/1999 Lyons et al.
6,480,106 B1 11/2002 Crombez et al.
(Continued)

FOREIGN PATENT DOCUMENTS

JP 2009189074 A 8/2009
WO 9916636 A1 4/1999

OTHER PUBLICATIONS

Freund, Ron, Living With A BEV: A Survey of User Experiences, Los Altos, CA, 2007, pp. 1-17.

*Primary Examiner* — Quan-Zhen Wang
*Assistant Examiner* — Israel Daramola
(74) *Attorney, Agent, or Firm* — Jennier M. Stec; Brooks Kushman P.C.

(57) ABSTRACT

A vehicle information display may include a split braking gauge for conveying information relating to braking operation and efficiency to assist drivers in maximizing energy capture during braking in vehicle with regenerative braking systems. The split braking gauge may incorporate a side-by-side or stacked configuration for conveying both regenerative braking and friction braking values. The split braking gauge may include fixed thresholds or boundaries associated with dynamic threshold values that can change based on current vehicle operating conditions.

8 Claims, 2 Drawing Sheets

(51) Int. Cl.

| | | |
|---|---|---|
| *B60L 7/26* | (2006.01) | |
| *B60L 11/12* | (2006.01) | |
| *B60L 11/18* | (2006.01) | |
| *B60T 1/10* | (2006.01) | |
| *B60T 13/58* | (2006.01) | |
| *B60K 6/445* | (2007.10) | |
| *B60W 30/18* | (2012.01) | |

(56) References Cited

U.S. PATENT DOCUMENTS

| | | | |
|---|---|---|---|
| 6,508,523 B2 * | 1/2003 | Yoshino | B60K 6/48 303/152 |
| 7,047,120 B2 | 5/2006 | Perach et al. | |
| 7,898,405 B2 | 3/2011 | Burke et al. | |
| 8,066,339 B2 * | 11/2011 | Crombez | B60L 7/18 303/152 |
| 8,204,664 B2 | 6/2012 | Minarcin et al. | |
| 8,248,221 B2 * | 8/2012 | Crombez | 340/439 |
| 8,855,880 B2 * | 10/2014 | Rowker et al. | 701/70 |
| 2007/0118255 A1 * | 5/2007 | Wakashiro et al. | 701/22 |
| 2007/0295544 A1 * | 12/2007 | Borroni-Bird et al. | 180/165 |
| 2009/0066495 A1 * | 3/2009 | Newhouse et al. | 340/439 |
| 2009/0234528 A1 | 9/2009 | Crombez | |
| 2009/0243827 A1 * | 10/2009 | Burke et al. | 340/439 |
| 2011/0066308 A1 * | 3/2011 | Yang et al. | 701/22 |
| 2011/0082632 A1 * | 4/2011 | Rowker et al. | 701/70 |
| 2011/0205044 A1 * | 8/2011 | Enomoto et al. | 340/439 |
| 2012/0179347 A1 * | 7/2012 | Aldighieri et al. | 701/70 |
| 2012/0179420 A1 * | 7/2012 | Gilman et al. | 702/165 |
| 2012/0235806 A1 * | 9/2012 | Watson et al. | 340/441 |

\* cited by examiner

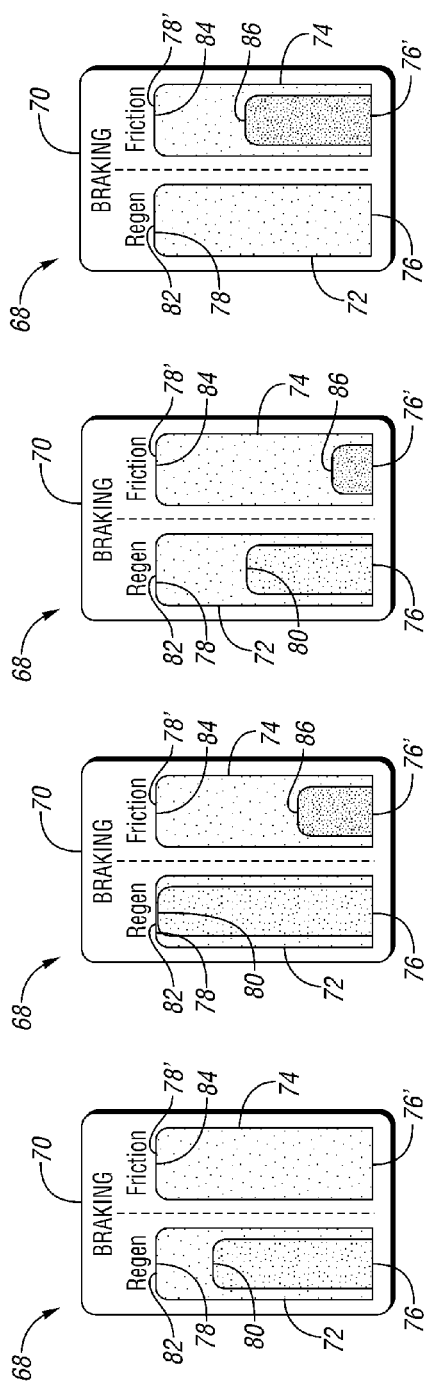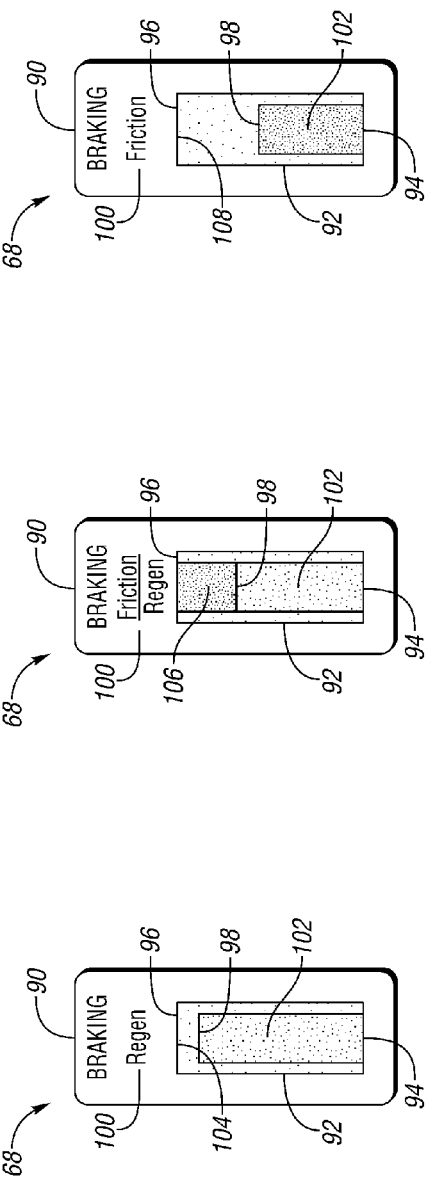

BRAKING DISPLAY SYSTEM AND METHOD

TECHNICAL FIELD

The present application relates to an information display system including a split braking gauge for conveying regenerative braking and friction braking values.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and operate these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Displaying certain types of information, particularly information relevant to HEVs, PHEVs or BEVs, can help facilitate economical driving choices or habits.

SUMMARY

The present application relates to an information display system for use in a motor vehicle having a regenerative braking system. According to one or more embodiments, an information display system may include a regenerative braking gauge and a corresponding control system. The regenerative braking gauge may include a regenerative braking indicator corresponding to a current regenerative braking value and a static regenerative braking threshold corresponding to a regenerative braking threshold value. The control system may receive at least one input related to current operating conditions of a vehicle and determine the regenerative braking threshold value based upon the current operating conditions. Further, the control system may provide at least one output to the regenerative braking gauge to position the regenerative braking indicator relative to the regenerative braking threshold based upon the current regenerative braking value and the regenerative braking threshold value.

In this regard, the regenerative braking threshold can remain at a fixed position despite corresponding to a regenerative braking threshold value that may be dynamic. The regenerative braking indicator can move along the regenerative braking gauge based upon its corresponding value and the current regenerative braking threshold value. Thus, the amount of regenerative braking being used relative to the current maximum can be determined at a quick glance.

According to one or more additional embodiments of the present application, a braking gauge for a vehicle may include a static first boundary, a static second boundary, and a braking indicator disposed between the first boundary and the second boundary. The braking gauge may further include a first region that is disposed between the braking indicator and the first boundary. The first region may correspond to a first braking percentage contributed from a first braking source. The braking gauge may further include a second region that is disposed between the braking indicator and the second boundary. The second region may correspond to a second braking percentage contributed from a second braking source.

Accordingly, the position of the braking indicator between the first boundary and the second boundary may indicate a current braking distribution between the first braking source and the second braking source. The first braking source may be associated with a regenerative braking system and the second braking source may be associated with a friction braking system.

The present application also relates to a method of displaying braking information to a driver of a vehicle. According to one or more embodiments, the method includes displaying a braking gauge having a fixed first boundary and a fixed second boundary. The method further includes determining a regenerative braking amount and a friction braking amount to obtain a total braking amount. Additionally, the method includes displaying an indicator disposed between the first and second boundary. The indicator may be positioned relative to the first and second boundaries to indicate the regenerative braking amount relative to the total braking amount when the regenerative braking amount and the friction braking amount are greater than zero.

BRIEF DESCRIPTION OF THE DRAWINGS

FIG. 2(a) depicts an exemplary information display including a braking gauge conveying a first braking mode according to one or more embodiments of the present application;

FIG. 2(b) depicts an exemplary information display including a braking gauge conveying a second braking mode according to one or more embodiments of the present application;

FIG. 2(c) depicts an exemplary information display including a braking gauge conveying a third braking mode according to one or more embodiments of the present application;

FIG. 2(d) depicts an exemplary information display including a braking gauge conveying a fourth braking mode according to one or more embodiments of the present application;

FIG. 3(a) depicts another exemplary information display including an alternate braking gauge conveying a first braking mode according to one or more embodiments of the present application;

FIG. 3(b) depicts another exemplary information display including an alternate braking gauge conveying a second braking mode according to one or more embodiments of the present application; and FIG. 3(c) depicts another exemplary information display including an alternate braking gauge conveying a third braking mode according to one or more embodiments of the present application.

DETAILED DESCRIPTION

Figure 1:
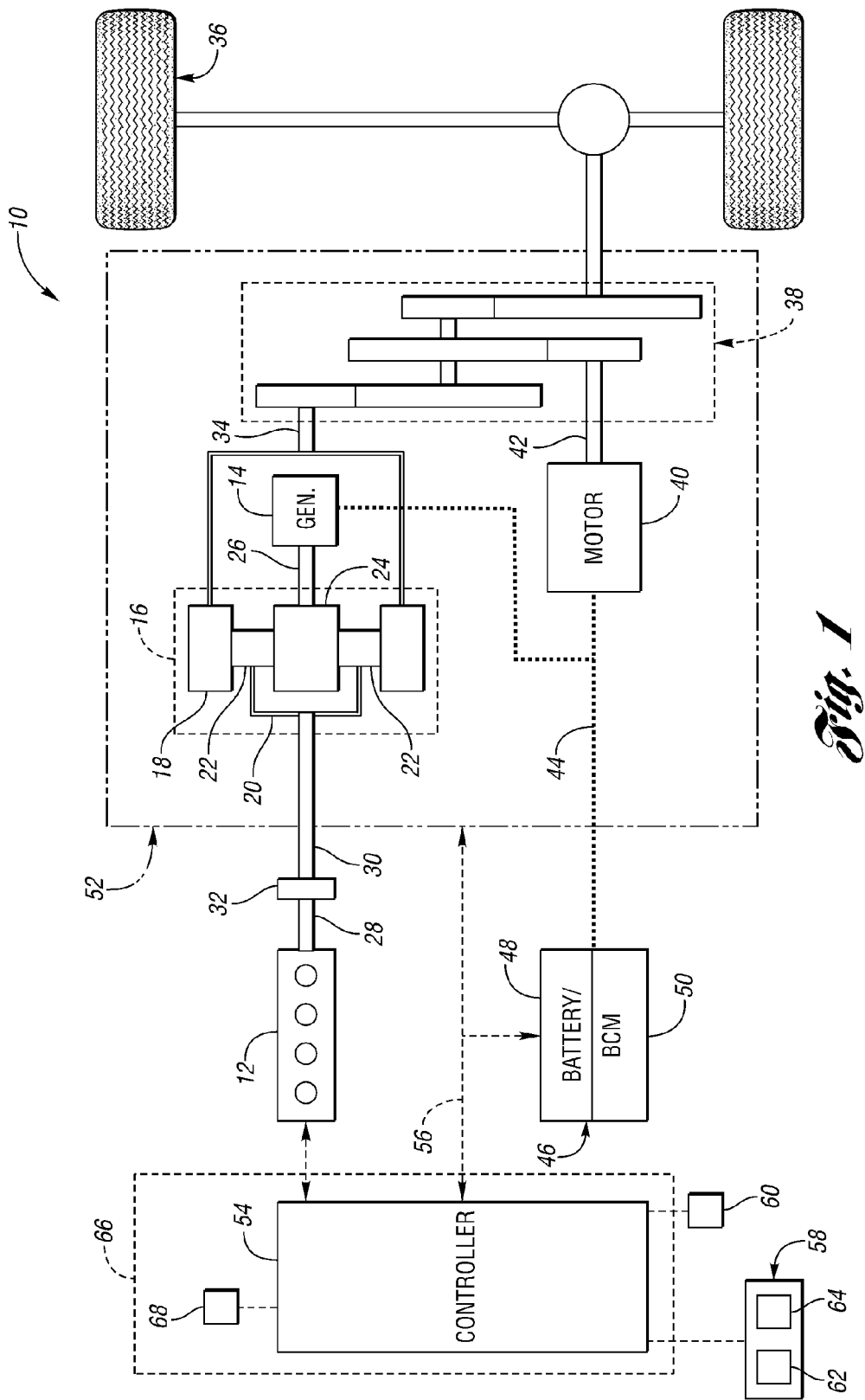
FIG. 1 is a simplified, exemplary schematic diagram of a vehicle including an information display system according to one or more embodiments of the present application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle computing system, shown generally as vehicle controller 54, may be provided. Although it is shown as a single controller, it may include or represent multiple controllers that may be used to control various vehicle systems or components. For example, the controller 54 may include a vehicle system controller/powertrain control module (VSC/PCM). In this regard, the PCM portion of the VSC/PCM may be software embedded within the VSC/PCM, or it can be a separate hardware device.

A controller area network (CAN) 56 may allow the controller 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as those powered by an internal combustion engine alone, an electric motor alone, a fuel cell, or the like.

Also shown in FIG. 1 are simplified schematic representations of a braking system 58 and an accelerator pedal 60. The braking system 58 may include such things as a brake pedal, position sensors, pressure sensors, or some combination thereof (not shown), as well as a mechanical connection to the vehicle wheels, such as the wheels 36, to effect friction braking via a friction braking system 62. The braking system 58 may also include a regenerative braking system 64, wherein braking energy is captured and stored as electrical energy in the battery 48. Similarly, the accelerator pedal 60 may include one or more sensors, which, like the sensors in the braking system 58, may communicate with the controller 54.

In addition to the foregoing, the vehicle 10 may include an information display system 66, which, as explained in detail below, can provide relevant vehicle content to the driver of the vehicle 10. As shown in FIG. 1, the information display system 66 may include an information display 68. The information display system 66 may also include its own display control system, which, for reference purposes, may be the controller 54. Although shown as the controller 54, the display control system may include a separate display control module that communicates with the main vehicle controller 54 similar to the BCM 50, and performs control functions on the information display 68. The controller 54 may be configured to receive input that relates to current operating conditions of the vehicle 10. Moreover, the controller 54, acting as a display control system, may provide output such that the information display 68 conveys driving or braking efficiency information, or other information relating to the operation of the vehicle 10, to the driver.

The information display 68 may be disposed within a dashboard (not shown) of the vehicle 10, such as in an instrument panel or center console area. Moreover, the information display 68 may be part of another display system, such as a navigation display system, or may be part of a dedicated information display system. The information display 68 may be a liquid crystal display (LCD), a plasma display, an organic light emitting display (OLED), or any other suitable display. The information display 68 may include a touch screen for receiving driver input associated with selected areas of the information display 68. The information display system 66 may also include one or more buttons (not shown), such as hard keys or soft keys located adjacent the information display 68, for effectuating driver input. Other operator inputs known to one of ordinary skill in the art may also be employed without departing from the scope of the present application.

Referring generally to FIGS. 2(*a-d*), the information display 68 is shown in greater detail in accordance with one or more embodiments of the present application. As seen therein, the information display 68 may include a braking gauge 70 capable of conveying braking efficiency information to a driver. The braking efficiency information conveyed by the braking gauge 70 can assist the driver in maximizing energy capture during a braking event in vehicles with a regenerative braking system, such as vehicle 10. To this end, the braking gauge 70 may be a split power (or torque) braking gauge that may include a regenerative braking gauge portion 72 and a friction braking gauge portion 74. As shown in FIGS. 2(*a-d*), the regenerative braking gauge portion 72 and the friction braking gauge portion 74 may be adjacent one another, for example, in a side-by-side configuration. Moreover, the regenerative braking gauge portion 72 and the friction braking gauge portion 74 may be linear gauges, as shown. Other gauge arrangements may also be employed.

With specific reference now to FIG. 2(*a*), an example of the braking gauge 70 during a state of a braking event is shown in accordance with one or more embodiments of the present application. The particular example provided in FIG. 2(*a*) depicts the braking gauge 70 in a regenerative braking only state (i.e., all regenerative braking) such as may often occur during the beginning of a braking event. As seen therein, regenerative braking gauge portion 72 may include a first boundary 76 and a second boundary 78. The regenerative braking gauge portion 72 may further include a regenerative braking indicator 80 associated with a regenerative braking value and a regenerative braking threshold 82 associated with a regenerative braking threshold value. The first boundary 76 may correspond to a lower limit value, which, in one or more embodiments, may be approximately equal to zero. The regenerative braking threshold 82 may be fixedly disposed at the second boundary 78. The regenerative braking indicator 80 may therefore be moveable between the first boundary 76 and the regenerative braking threshold 82 based on the regenerative braking value. In this regard, the regenerative braking threshold 82 may be static, while the regenerative braking indicator 80 is dynamic. Although the regenerative braking threshold 82 may be fixed at the second boundary 78 according to one or more embodiments, the regenerative braking threshold value itself may vary. Accordingly, the regenerative braking indicator 80 may provide an indication of the current regenerative braking value relative to the current regenerative braking threshold value.

According to one or more alternate embodiments, the regenerative braking threshold 82 may be dynamically disposed between the first boundary 76 and the second boundary 78. In this regard, the regenerative braking threshold 82 may move in accordance with the regenerative braking threshold value. Moreover, the regenerative braking indicator 80 may indicate an actual regenerative braking value rather than a value that is merely relative to the regenerative braking threshold value such as a percentage.

Referring back to FIG. 2(*a*), the regenerative braking indicator 80 may define a bar segment extending from the first boundary 76 towards the second boundary 78 to help indicate the regenerative braking value, particularly in relation to the regenerative braking threshold value associated with the regenerative braking threshold 82. Similar to the regenerative braking gauge portion 72, the friction braking gauge portion 74 also includes a first boundary 76' and a second boundary 78'. Likewise, the first boundary 76' may correspond to a lower limit value, which, in one or more embodiments, may be approximately equal to zero. Moreover, a friction braking threshold 84 associated with a maximum friction braking value may be fixedly disposed at the second boundary 78'. The maximum friction braking value may be a calibrateable maximum value obtained from calibrateable tables stored in a memory device (not shown) of the information display system 66 (e.g., in the controller 54). This may allow for non-linear, tunable behavior of the friction braking system 62.

The friction braking gauge portion 74 may also include a friction braking indicator 86 (best shown in FIGS. 2(*b*)-(*d*)) associated with a friction braking value. Like the regenerative braking indicator 80, the friction braking indicator 86 may be moveable between the first boundary 76' and the friction braking threshold 84 based on the friction braking value. When only regenerative braking is being employed during a braking event, as depicted in FIG. 2(*a*), the friction braking indicator 86 may be disposed at the first boundary 76' or may not be displayed at all.

According to one or more embodiments of the present application, the regenerative braking values and the friction braking values may be power values. Alternatively, the braking values associated with the indicators and thresholds may be torque-based. The controller 54 may receive one or more inputs relating to current vehicle operating conditions. For instance, the controller 54 may receive input signals corresponding to vehicle speed, accelerator and/or brake pedal position, battery charge limits, torque limits, and the like. Based on the at least one input, the controller 54 may determine at least the regenerative braking threshold value, the regenerative braking value, the friction braking value, as well as a total braking value.

In a power-based system, the total braking value, $P_t$, which encompasses both regenerative braking and friction braking, may be calculated using the following general equation:

$$P_t = T_r + T_f * V_{sp} \qquad (1)$$

where: $T_r$=regenerative torque,
$T_f$=friction torque, and
$V_{sp}$=vehicle speed.

The regenerative torque, $T_r$, may refer to the portion of the total braking torque being applied by regenerative braking. The friction torque, $T_f$, may refer to the portion of the total baking torque being applied by friction.

As a more specific example, the total braking power value, $P_t$, may be calculated according to the following equation:

$$P_t = T_{ar} + T_{bsm} + T_f * \frac{S_m}{R_{mw}} \qquad (2)$$

where: $T_{ar}$=accelerator torque request,
$T_{bsm}$=brake system torque modification,
$T_f$=friction torque,
$S_m$=motor speed, and
$R_{mw}$=motor to wheel gear ratio.

The accelerator torque request, $T_{ar}$, may refer to the torque requested by a driver via the accelerator pedal, which can either positive or negative. The brake system torque modification, $T_{bsm}$, may refer to the amount of braking torque added by the powertrain beyond that requested via the accelerator pedal. The motor speed, $S_m$, may refer to the rotational speed of the motor 40. The motor to wheel gear ratio, $R_{mw}$, may refer to the ratio between the wheels 36 and the motor 40.

As previously described, the regenerative braking threshold value may be dynamic and, thus, may vary with changes in current vehicle operating conditions. According to one or more embodiments of the present application, the regenerative braking threshold value may be the minimum of either (1) the powertrain brake torque limit multiplied by the vehicle speed or (2) the electrical charge system power limit of the battery 48. In more specific terms, the regenerative braking threshold value, $P_{r,\,thresh}$, may be calculated using the following equation:

$$P_{r,thresh} = \min\left[T_l * \frac{S_m}{R_{mw}}, P_{l,batt}\right] \quad (3)$$

where: $T_l$=powertrain brake torque limit,
$S_m$=motor speed,
$R_{mw}$=motor to wheel gear ratio, and
$P_{l,\,batt}$=battery electrical charge system power limit.

Thus, the amount of regenerative braking may be limited by the capability of the vehicle's powertrain to apply a negative torque (i.e., the powertrain brake torque limit, $T_l$) or the amount of additional charge the battery 48 can accept in its current state (i.e., the battery electrical charge system power limit, $P_{l,\,batt}$). The battery electrical charge system power limit, $P_{l,\,batt}$, may be affected by charge level, temperature, and the like.

According to one or more embodiments, the regenerative braking value, $P_r$, may be calculated using the following general equation:

$$P_r = T_r * V_{sp} \quad (4)$$

where: $T_r$=regenerative torque, and
$V_{sp}$=vehicle speed.

As a more specific example, the regenerative braking value, $P_r$, may be calculated according to the following equation:

$$P_r = T_{ar} + T_{bsm} * \frac{S_m}{R_{mw}} \quad (5)$$

where: $T_{ar}$=accelerator torque request,
$T_{bsm}$=brake system torque modification,
$S_m$=motor speed, and
$R_{mw}$=motor to wheel gear ratio.

According to one or more embodiments, the friction braking value, $P_f$, may be calculated using the following general equation:

$$P_f = T_f * V_{sp} \quad (6)$$

where: $T_f$=friction torque, and
$V_{sp}$=vehicle speed.

As a more specific example, the friction braking value, $P_f$, may be calculated according to the following equation:

$$P_f = T_f * \frac{S_m}{R_{mw}} \quad (7)$$

where: $T_f$=friction torque,
$S_m$=motor speed, and
$R_{mw}$=motor to wheel gear ratio.

As previously described, the regenerative braking threshold 82 may be fixed at the second boundary 78, though the regenerative braking threshold value itself may vary. Accordingly, the regenerative braking indicator 80 may indicate the current regenerative braking value relative to the current regenerative braking threshold value. Stated differently, the regenerative braking indicator 80 may be disposed between the first boundary 76 and the regenerative braking threshold 82 based upon the ratio between the regenerative braking value and the regenerative braking threshold value. The ratio may, of course, be expressed as a percentage. To this end, the regenerative braking percentage for display, $P_{r\,(\%)}$, may be calculated using the following general equation:

$$P_{r(\%)} = \frac{P_r}{P_{r,thresh}} * 100 \quad (8)$$

Similarly, the current friction braking value may be expressed as a percentage of the maximum friction braking value using the friction braking indicator 86. For example, for display purposes, the current friction braking value may be mapped from 0%-100%, where 0% corresponds to zero friction braking and 100% corresponds to the calibrateable maximum friction braking value represented by the friction braking threshold 84. As previously described, mapping of the friction braking value to a friction braking percentage for display may be done using calibrateable tables to allow for non-linear, tunable behavior.

While equations (1)-(8) above correspond to power-based braking values, the equations for a braking gauge that employs torque-based values are similar. In particular, the torque-based equations can be obtained by removing the speed components from the power-based equations (e.g., $V_{sp}$, or $S_m/R_{mw}$) and converting the electrical charge system power limit of the battery 48 to the torque domain.

FIG. 2(a) depicts an example of the braking gauge 70 when the vehicle 10 is in a regenerative braking only state (i.e., all regenerative braking) such as may often occur during the beginning of a braking event. Thus, the friction braking indicator 86 may be absent or may be positioned at the first boundary 76' to indicate that no friction braking is occurring. Also, as shown in FIG. 2(a), the regenerative braking indicator 80 has not reached the regenerative braking threshold 82. This may indicate that additional regenerative braking may still occur or that regenerative braking has not been optimized fully. Maximizing regenerative braking can lead to increased efficiency in vehicles equipped with energy storage devices that help to power drive motors, such as in BEVs and HEVs. By fixing the regenerative braking threshold 82 at the second boundary 78, even though its corresponding regenerative braking threshold value may vary, the braking gauge 70 may be less distracting and easier to understand. This is particularly helpful and more conducive to drivers who want to be informed about their braking performance with just a quick glance at the braking gauge 70 when driving while keeping their primary focus on the road.

FIG. 2(b) illustrates an example of the braking gauge 70 during a different state of a braking event in accordance with one or more embodiments of the present application. For instance, during a braking event, when the total braking demand exceeds the amount of braking that can be supplied by the regenerative braking system 64 (i.e., the regenerative braking threshold value), the friction braking system 62 may be engaged to make up the difference. The particular example provided in FIG. 2(*b*) depicts the braking gauge 70 during such a braking state. As seen therein, the regenerative braking indicator 80 may be displayed at the regenerative braking threshold 82 to indicate to a driver that the regenerative braking threshold value has been reached. Correspondingly, the friction braking indicator 86 may be displayed between the first boundary 76' and the friction braking threshold 84 to indicate that the friction brakes are being employed. This may signal to a driver that inefficient braking is occurring because energy being applied to the friction brakes is lost as heat. As previously described, the friction braking indicator 86 may be positioned on the friction braking gauge portion 74 relative to the friction braking threshold 84 based on the current friction braking value and the maximum friction braking value.

As shown in FIG. 2(*b*), regenerative braking may typically be at its threshold when friction braking is introduced during a braking event. However, according to one or more embodiments of the present application, a blend of regenerative braking and friction braking may occur despite the regenerative braking value not reaching the regenerative braking threshold value. FIG. 2(*c*) illustrates an example of the braking gauge 70 during such a blended braking state. As seen therein, the regenerative braking indicator 80 may be displayed below the regenerative braking threshold 82 (indicating the regenerative braking threshold value has not been reached), while the friction braking indicator 86 indicates that some friction braking is occurring simultaneously. A blended braking state as depicted in FIG. 2(*c*) may occur, for example, near the end of a braking event or at the beginning of a hard braking event. A hard braking event may occur when heavy pressure is applied to the brake pedal signaling a relatively high brake demand (such as when a driver slams on the brakes). Thus, as shown in FIG. 2(*c*), the regenerative braking indicator 80 and the friction braking indicator 86 can move independently of one another. That is, the friction braking indicator 86 does not move solely when the regenerative braking indicator 80 has reached the regenerative braking threshold 82.

Even when regenerative braking is not at its current maximum, friction braking may be introduced to the braking system 58 at lower vehicle speeds. Friction braking may be introduced in this manner while regenerative braking is phased out. Eventually, regenerative braking may be phased out completely, as is illustrated in FIG. 2(*d*), prior to the vehicle speed reaching zero, for reasons understood by those skilled in the art. Thus, near the end of a braking event, a vehicle may be slowed to a complete stop using only friction braking.

According to one or more embodiments of the present application, friction braking may begin being blended with regenerative braking once the vehicle speed is below a first vehicle speed threshold. Moreover, regenerative braking may be removed entirely when the vehicle speed drops below a second vehicle speed threshold that is less than the first vehicle speed threshold. The vehicle may begin phasing out regenerative braking at the first vehicle speed threshold such that regenerative braking is gradually reduced until it can be phased out completely at the second vehicle speed threshold. The gradual phasing out of regenerative braking in this manner provides for a smoother transition from regenerative braking only to friction braking only. Displaying the friction braking indicator 86 between the first boundary 76' and the friction braking threshold 84 when the regenerative braking indicator 80 is not at the regenerative braking threshold 82, as shown in FIGS. 2(*c*)-(*d*), may inform drivers that the occurrence of friction braking is not necessarily due to inefficient braking on their part.

FIGS. 3(*a*)-(*c*) illustrate one or more alternate embodiments of the present application. In general, FIGS. 3(*a*)-(*c*) depict a braking gauge 90 for conveying braking information to a driver of the vehicle 10. Rather than having two side-by-side gauge portions, a single braking gauge portion 92 may be employed for conveying both regenerative braking information and friction braking information in a stacked configuration. The braking gauge 90 may include a first boundary 94 and a second boundary 96. Both the first and second boundaries may be static such that their positions do not change. The braking gauge 90 may further include a braking indicator 98 disposed between the first boundary 94 and the second boundary 96 during a braking event. Additionally or alternatively, a braking status indicator 100 that indicates the current state of braking may be disposed adjacent the braking gauge portion 92. For example, the braking status indicator 100 may convey whether the braking system 58 of the vehicle 10 is operating in a regenerative braking only mode, a friction braking only mode, or a blended braking mode. According to one or more embodiments, the braking status indicator 100 may be text that is displayed or illuminated based upon the current braking state.

With specific reference to FIG. 3(*a*), an exemplary embodiment of the braking gauge 90 in a regenerative braking only mode is illustrated. As seen therein, the braking gauge 90 may include a first region 102 defined by the braking indicator 98 and the first boundary 94. In the regenerative braking only mode, the second boundary 96 may be a regenerative braking threshold 104 corresponding to the regenerative braking threshold value. Moreover, the braking indicator 98 may correspond to the regenerative braking value. In this regard, the braking gauge 90 in FIG. 3(*a*) may function similarly to the regenerative braking gauge portion 72 depicted in FIGS. 2(*a*)-(*d*) when the regenerative braking value is less than the regenerative braking threshold value and the friction braking value is approximately equal to zero. Accordingly, the braking indicator 98 may indicate the current regenerative braking value relative to the current regenerative braking threshold value. The braking indicator 98 may be disposed between the first boundary 94 and the regenerative braking threshold 104 based upon the ratio between the regenerative braking value and the regenerative braking threshold value. The ratio may, of course, be expressed as the regenerative braking percentage for display, $P_{r\ (\%)}$, as can be calculated using equation (8).

As shown in FIG. 3(*a*), the braking status indicator 100 may also indicate that the vehicle is in a regenerative braking only mode. The braking status indicator 100 may display, illuminate, or otherwise convey the regenerative braking only mode. For example, the braking status indicator 100 may display the text "REGEN." The braking gauge 90 may utilize other indicators as well. For instance, regenerative braking may be associated with a particular color or color shade of the braking indicator 98 and/or the first region 102. Thus, when only the first region 102 is displayed in a color associated with regenerative braking, a driver may be alerted as to the regenerative braking only mode.

FIG. 3(*b*) illustrates an exemplary embodiment of the braking gauge 90 in a blended braking mode according to one or more embodiments of the present application. As seen therein, the braking gauge 90 may further include a second region 106 disposed between the braking indicator 98 and the second boundary 96. The first region 102 may correspond to a first braking percentage contributed from a first braking source. The second region 106 may correspond to a second braking percentage contributed from a second braking source. Thus, the position of the braking indicator 98 between the first and second boundaries may indicate a current braking distribution between the first braking source and the second braking source. Further, the distance between the first boundary 94 and the second boundary 96, though fixed, may be representative of the total braking power (or torque).

The first braking source may be the regenerative braking system 64 and the second braking source may be the friction braking system 62. When the vehicle speed exceeds a first speed threshold, friction braking may not contribute to the total braking until the regenerative braking value reaches the regenerative braking threshold value. However, when the total brake demand exceeds the regenerative braking threshold value, the friction braking system 62 may be engaged to meet the total brake demand. In this regard, the braking indicator 98 may move away from the second boundary 96 towards the first boundary 94 as friction braking is increased, which in turn increases the percent contribution of the friction braking system 62 to the total braking amount. Moreover, the braking indicator 98 may correspond to the regenerative braking threshold 104 when the regenerative braking threshold value has been reached and the vehicle speed exceeds the first speed threshold. Accordingly, the first region 102 may correspond to a current regenerative braking value approximately equal to a regenerative braking threshold value when vehicle speed exceeds the first speed threshold.

As previously described, a blend of regenerative braking and friction braking may occur even if the regenerative braking value has not reached the regenerative braking threshold value. Even when regenerative braking is not at its current maximum, friction braking may be introduced to the braking system 58 at lower vehicle speeds. Friction braking may be introduced in this manner while regenerative braking is phased out. Eventually, regenerative braking may be phased out completely prior to the vehicle speed reaching zero.

According to one or more embodiments of the present application, friction braking may begin being blended with regenerative braking once the vehicle speed is below the first vehicle speed threshold. Moreover, regenerative braking may be removed entirely when the vehicle speed drops below a second vehicle speed threshold that is less than the first vehicle speed threshold. The vehicle may begin phasing out regenerative braking at the first vehicle speed threshold such that regenerative braking is gradually reduced until it can be phased out completely at the second vehicle speed threshold. The gradual phasing out of regenerative braking in this manner provides for a smoother transition from regenerative braking only to friction braking only.

In this regard, the braking indicator 98 may not necessarily correspond to the regenerative braking threshold value. Rather, it may just provide an indication of the braking distribution between the regenerative braking system 64 and the friction braking system 62. Accordingly, the first region 102 may correspond to a current regenerative braking value less than the regenerative braking threshold value when vehicle speed is less than a first speed threshold and greater than a second speed threshold. In one or more embodiments of the present application, the braking status indicator 100 may also convey that the vehicle 10 is operating in the blended braking mode. For example, the braking status indicator 100 may display text including both "REGEN" and "FRICTION." Moreover, the term "FRICTION" may be shown above the term "REGEN" when the second region 106 is associated with friction braking. Alternatively, the braking status indicator 100 may instead display "BLEND" or similar text when a combination of regenerative braking and friction braking is being applied.

FIG. 3(*c*) illustrates an exemplary embodiment of the braking gauge 90 in a friction braking only mode according to one or more embodiments of the present application. As previously described, the friction braking only mode may occur, for example, at vehicle speeds less than the second speed threshold. As seen therein, the braking gauge 90 may include the first region 102 defined by the braking indicator 98 and the first boundary 94. In the friction braking only mode, the second boundary 96 may be a friction braking threshold 108 corresponding to a maximum friction braking value. Moreover, the braking indicator 98 may correspond to the current friction braking value. In this regard, the braking gauge 90 in FIG. 3(*c*) may function similarly to the friction braking gauge portion 74 depicted in FIGS. 2(*a*)-(*d*) when the regenerative braking value is zero. Accordingly, the braking indicator 98 may indicate the current friction braking value relative to the current maximum friction braking value. The braking indicator 98 may be disposed between the first boundary 94 and the second boundary 96 based upon the current friction braking value mapped from 0%-100%, where 0% corresponds to zero friction braking (e.g., the first boundary) and 100% corresponds to the calibrateable maximum friction braking value represented by the friction braking threshold (e.g., the second boundary). As previously described, mapping of the friction braking value to a friction braking percentage for display may be done using calibrateable tables to allow for non-linear, tunable behavior.

As shown in FIG. 3(*c*), the braking status indicator 100 may also indicate that the vehicle 10 is in a friction braking only mode. The braking status indicator 100 may display, illuminate, or otherwise convey the friction braking only mode. For example, the braking status indicator 100 may display the text "FRICTION." The braking gauge 90 may utilize other indicators as well. For instance, friction braking may be associated with a particular color or color shade of the braking indicator 98 and/or the first region 102. Thus, when only the first region 102 is displayed in a color associated with friction braking, a driver may be alerted as to the friction only braking mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   displaying by a controller indicia defined by boundaries positioned a fixed distance away from each other during regenerative and friction braking, and representing a total for the regenerative and friction braking such that the fixed distance remains constant as a value of the total changes, and representing a relative contribution of each of regenerative and friction brake power to the total.

2. The method of claim 1, wherein the boundaries are positioned a distance away from each other during exclusive regenerative braking such that the distance changes as a value of the regenerative braking changes.

3. The method of claim 1, wherein the boundaries are positioned a distance away from each other during exclusive friction braking such that the distance changes as a value of the friction braking changes.

4. The method of claim 1 further comprising displaying a scale extending between the boundaries representing the value.

5. A vehicle comprising:
   a friction brake;
   a regenerative brake; and
   a controller programmed to display indicia defined by boundaries positioned a fixed distance away from each other during regenerative and friction braking, and representing a total for the regenerative and friction braking such that the fixed distance remains constant as a value of the total changes, and representing a relative contribution of each of regenerative and friction brake power to the total.

6. The vehicle of claim 5, wherein the boundaries are positioned a distance away from each other during exclusive regenerative braking such that the distance changes as a value of the regenerative braking changes.

7. The vehicle of claim 5, wherein the boundaries are positioned a distance away from each other during exclusive friction braking such that the distance changes as a value of the friction braking changes.

8. The vehicle of claim 5 further comprising a scale extending between the boundaries representing the value.

* * * * *